Figure 1:
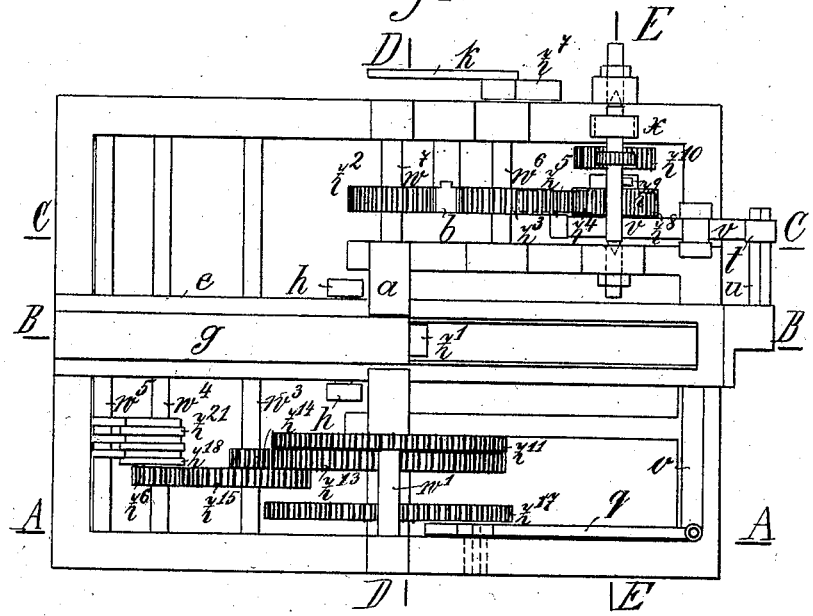

No. 758,388. PATENTED APR. 26, 1904.
C. SCHENCK.
AUTOMATIC SHIFTING WEIGHT SCALE.
APPLICATION FILED JULY 25, 1903.

NO MODEL. 3 SHEETS—SHEET 1.

WITNESSES:
W. M. Avery
R. B. Cavanagh

INVENTOR
Carl Schenck
BY
Munn & Co.
ATTORNEYS.

No. 758,388. PATENTED APR. 26, 1904.
C. SCHENCK.
AUTOMATIC SHIFTING WEIGHT SCALE.
APPLICATION FILED JULY 25, 1903.
NO MODEL. 3 SHEETS—SHEET 2.

WITNESSES:
W. M. Avery
R. B. Cavanagh

INVENTOR
Carl Schenck
BY
Munn & Co
ATTORNEYS.

No. 758,388. PATENTED APR. 26, 1904.
C. SCHENCK.
AUTOMATIC SHIFTING WEIGHT SCALE.
APPLICATION FILED JULY 25, 1903.
NO MODEL. 3 SHEETS—SHEET 3.

WITNESSES:
W. M. Avery
R. B. Cavanagh

INVENTOR
Carl Schenck
BY
Munn & Co.
ATTORNEYS.

No. 758,388. Patented April 26, 1904.

UNITED STATES PATENT OFFICE.

CARL SCHENCK, OF DARMSTADT, GERMANY.

AUTOMATIC SHIFTING-WEIGHT SCALE.

SPECIFICATION forming part of Letters Patent No. 758,388, dated April 26, 1904.

Application filed July 25, 1903. Serial No. 167,019. (No model.)

*To all whom it may concern:*

Be it known that I, CARL SCHENCK, commercial counselor, a subject of the Grand Duke of Hesse, residing at 3 Wendelstadtstrasse, Darmstadt, in the Grand Dukedom of Hesse, German Empire, have invented certain new and useful Improvements in Automatic Shifting-Weight Scales, of which the following is a specification.

This invention has reference to improvements in automatic shifting-weight scales; and it consists in a pressure which acts upon the beam of the scales, being relieved or taken off when the scales are balanced out, and in a kind of escapement being made to operate upon the further movement of the shifting weight beyond the point of equilibrium, the said escapement retarding the movement of the shifting weight and allowing the gentle engagement of the ratchet-pawl.

Heretofore the employment of self-acting shifting-weight scales was restricted to the weighing of loads the weight of which varies within certain limits only. By the improvement constituting the subject of this invention, however, loads may be weighed from zero up to the maximum capacity of the scales, the weighing requiring not more time than heretofore and being just as exact.

The invention consists, essentially, in an arrangement whereby the movement of the shifting weight is retarded in the proximity of the position of equilibrium and in the throwing in operation of a revoluble ratchet-wheel, so that the above-mentioned arrangement is instrumental in bringing about a gentle and certain engagement of the ratchet-pawl with the ratchet-wheel. Instead of a revoluble ratchet-wheel a rack-bar has been used heretofore, which would become too long, even with very delicate graduation, if it should be required to indicate only one-thousandth of the weight of the load. In revoluble ratchet-wheels, however, the number of the stopping-points is equal to the product of the number of teeth of the ratchet-wheel and of the number of revolutions.

In the drawings a preferred form of the arrangement according to the present invention is shown by way of example.

Figure 2:
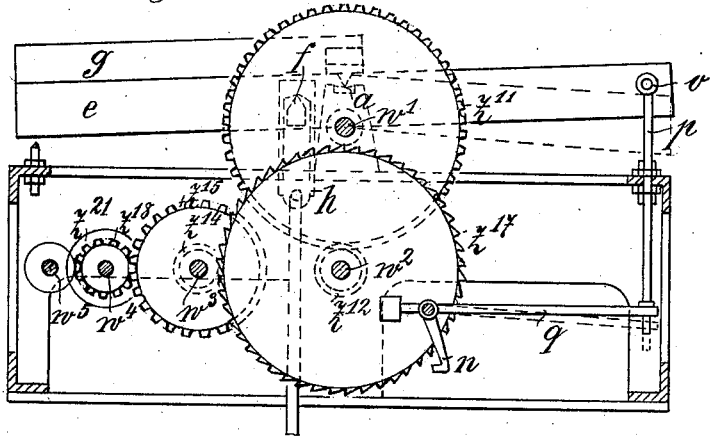
Figure 3:
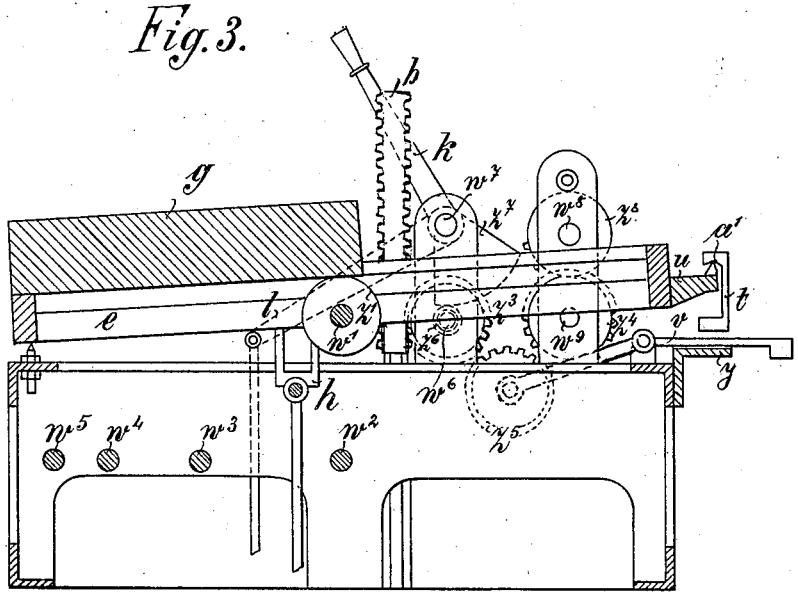
Figure 4:
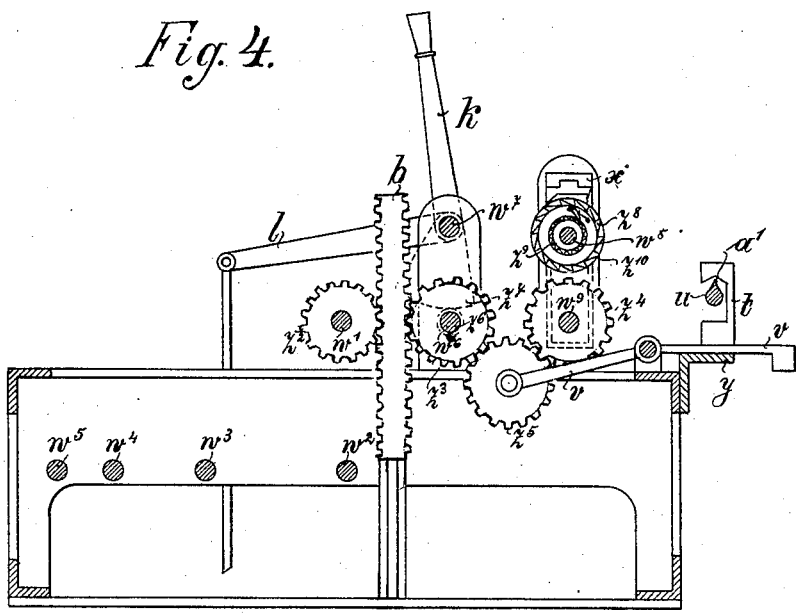
Figure 6:
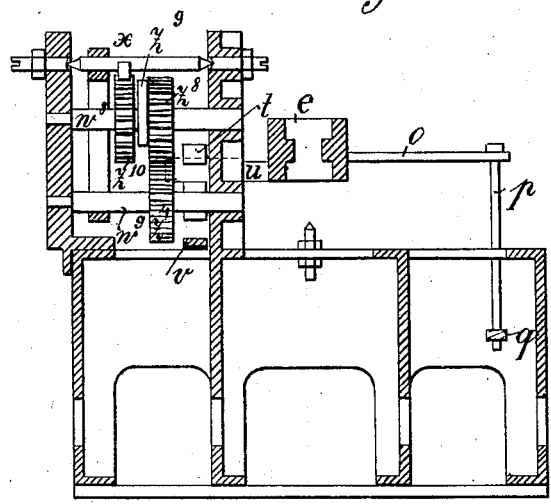
Figure 5:
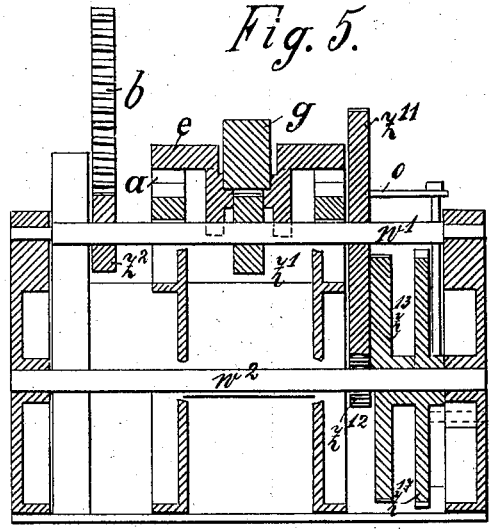

Figure 1 shows the device in plan view. Fig. 2 is a section on the line A A of Fig. 1. Fig. 3 is a section on the line B B of Fig. 1. Fig. 4 is a section on the line C C of Fig. 1 in the position of equilibrium. Fig. 5 is a section on the line D D of Fig. 1. Fig. 6 is a section on the line E E of Fig. 1.

The balance-beam $e$ is supported by the center knives $a$ and is provided at a suitable distance from the latter with two knives $f$, to which the load becomes operatively attached by means of the two hangers $h$, Fig. 2. Upon the balance-beam a shifting weight $g$ is arranged, the bottom side of which is provided with teeth engaging with the gear-wheel $z'$. The rotating-point of the knife $a$ is exactly in the center of the pitch-line of the wheel $z'$. The gear-wheel $z'$ is mounted on the shaft $w'$, which is driven by any suitable gear, a loaded bar $b$, which is provided with teeth on both sides, being used in the present instance. A gear-wheel $z^2$ transmits the movement from the rack-bar $b$ to the shaft $w'$, Figs. 1, 4, and 5. After the weighing has been effected the driving mechanism is returned to its initial position either by hand or by the weight of the dropping load. In the present instance this is effected by the levers $k$ and $l$, which are mounted on the shaft $w^7$. To the latter is also keyed a toothed segment $z^7$, Figs. 1, 3, and 4, which engages with a toothed wheel $z^6$ on the shaft $w^6$, which in its turn transmits the movement to the weighted bar $b$ by means of the gear-wheel $z^3$.

The mechanism for operating the shifting weight is connected to an escapement mechanism, which in the present instance consists of a pendulum and an escapement-wheel. Any other suitable escapement may also be used instead of this mechanism. The escapement in this case embraces the pendulum $x$, which engages with the escapement-wheel $z^{10}$, which is connected to a ratchet-wheel $z^9$, keyed to the shaft $w^8$ at the side of the gear-wheel $z^8$. With the gear-wheel $z^8$ engages the gear-wheel $z^4$ on the shaft $w^9$. The connection with the toothed wheel $z^3$, which engages with the weighted bar $b$, is effected by the loose gear-wheel $z^5$ upon the rotation of the two-armed lever $v$, connected thereto.

The device for effecting the engagement of the escapement mechanism comprises a weight $t$, Figs. 3 and 4, which is suspended from the knives $a'$ of the extremity $u$ of the scale-beam. Upon the rotation of the scale-beam the weight $t$ can act upon the two-armed lever $v$, whereupon the latter is capable of being rotated until the gear $z^5$ becomes engaged with $z^3$ and $z^4$. In this position the lever $v$ is resting against the stop $y$.

The transmission of movement of the shifting weight upon the revoluble ratchet-wheel $z^{17}$ is effected by the gear-wheel $z^{11}$ upon the shaft $w'$, which engages with the gear-wheel $z^{12}$, keyed to the shaft $w^2$, together with the gear-wheel $z^{17}$. From the shaft $w^2$ movement is further transmitted, by means of the gear-wheel $z^{13}$, to the dial or indicator-disks $z^{18}$ $z^{21}$ by the medium of the intermediate wheels $z^{14}$ $z^{15}$ $z^{16}$, (Figs. 1 and 2,) which are mounted upon the shafts $w^3$ $w^4$ $w^5$.

The stopping of the revoluble ratchet-wheel $z^{17}$ is effected by the system of levers $o$ $p$ $q$, which are connected to the scale-beam and to the hook $n$, which engages with the ratchet-wheel $z^{17}$ in case the scale-beam after the position of equilibrium has been reached continues its rotation, and thereby effects the movement of the system of the levers $o$ $p$ $q$ with the hook $n$.

The operation of the device may be described as follows: Upon the release of the driving mechanism the shifting weight $g$ will move along the scale-beam $e$ from left to right until the ratchet-pawl becomes engaged and the movement is thereby interrupted. The shifting will take place very quickly as long as the driving mechanism is not connected with the escapement mechanism, and it will only be retarded after this connection has been effected. The movement of the shifting weight begins at a point which corresponds to the position of equilibrium of the unloaded scale-beam with the additional weight $t$ mounted thereon. If the load is suspended from the knives $f$ and the driving mechanism of the shifting weight is made to operate, the shifting weight is moved up to a point of the scale-beam in which the equilibrium is restored. The now ensuing rotation of the scale-beam will cause the pressure which the additional weight $t$ produces upon the right-hand end of the scale-beam to be suddenly taken off, and the weight on the scale-beam is thereby somewhat lessened. This causes the shifting weight $q$ to continue its movement, but with a reduced speed as compared with its former movement, inasmuch as the load of the additional weight $t$, which has been taken off from the scale-beam, has now caused the engagement of an escapement mechanism with the driving mechanism of the shifting weight.

Upon the now ensuing movement of the parts beyond the point of equilibrium the ratchet-pawl $n$, connected to the scale-beam, is able to drop into engagement with the ratchet-wheel gently and securely in consequence of the slow movement of the ratchet-wheel.

What I claim, and desire to secure by Letters Patent of the United States, is—

1. The combination of a scale-beam, a shifting weight carried by said beam, means for shifting said weight along the beam, a second weight connected to the scale-beam opposite the load, means for releasing the second weight when the point of equilibrium is attained, escapement mechanism, and an engagement mechanism for the escapement mechanism operated by the movement of the second weight for causing the retarding of the shifting weight by the escapement mechanism.

2. The combination of a pivoted scale-beam, a shifting weight on said beam, driving mechanism for actuating said shifting weight, means for releasing the driving mechanism to permit the shifting of the weight relative to the beam, an escapement mechanism including a pendulum, and an escapement-wheel, a connection between the weight - operating mechanism and the escapement mechanism, and means for operating the escapement mechanism to cause the latter to retard the movement of the shifting weight.

3. The combination of a scale-beam, a shifting weight thereon, means for shifting said weight along the beam with a relatively quick movement, means for reducing the speed of movement of the weight before it has reached the limit of its movement, and means for checking entirely the movement of the weight.

4. The combination of a scale-beam, a shifting weight thereon, said weight having a serrated or toothed surface, a gear-wheel engaging with the toothed surface of the weight, means for imparting motion to the gear-wheel to cause the movement of the weight, and means for reducing the speed of movement of the weight before it has reached the limit of its movement along said beam.

5. The combination of a scale-beam, a shifting weight thereon, means for imparting movement to said weight, and means for reducing the speed of movement of the weight, said latter means including an escapement mechanism, and a second weight for assisting in putting the escapement mechanism into operation, substantially as set forth.

In witness whereof I have hereunto signed my name in the presence of two subscribing witnesses.

CARL SCHENCK.

Witnesses:
 WALTER HAUSING,
 WALTER SCHUMANN.